(12) United States Patent
Hecht

(10) Patent No.: US 10,525,537 B2
(45) Date of Patent: Jan. 7, 2020

(54) ROTARY CUTTING TOOL HAVING DISK-SHAPED CUTTING BODY AND INDEXABLE CUTTING INSERT THEREFOR

(71) Applicant: ISCAR LTD., Tefen (IL)

(72) Inventor: Gil Hecht, Nahariya (IL)

(73) Assignee: ISCAR LTD., Tefen (IL)

( * ) Notice: Subject to any disclaimer, the term of this patent is extended or adjusted under 35 U.S.C. 154(b) by 143 days.

(21) Appl. No.: 15/815,836

(22) Filed: Nov. 17, 2017

(65) Prior Publication Data
US 2019/0151963 A1    May 23, 2019

(51) Int. Cl.
*B23C 5/08* (2006.01)
*B23C 5/22* (2006.01)
*B23C 5/20* (2006.01)

(52) U.S. Cl.
CPC .............. *B23C 5/08* (2013.01); *B23C 5/207* (2013.01); *B23C 5/2213* (2013.01);
(Continued)

(58) Field of Classification Search
CPC ... B23B 27/1659; B23B 27/1614; B23C 5/08; B23C 5/202; B23C 5/207; B23C 5/2213;
(Continued)

(56) References Cited

U.S. PATENT DOCUMENTS 6,238,146 B1 *  5/2001  Satran ................. B23B 27/1614
                                                    407/113
9,144,851 B2 *  9/2015  Bhagath .................... B23C 5/08
(Continued)

FOREIGN PATENT DOCUMENTS

DE   10 2007 011 395 A1    9/2008
EP       2 450 138 A1      5/2012
(Continued)

OTHER PUBLICATIONS

International Search Report dated Feb. 12, 2019 for International Patent Application No. PCT/IL2018/051116 (6 pages).
(Continued)

*Primary Examiner* — Willmon Fridie, Jr.
(74) *Attorney, Agent, or Firm* — Smith, Gambrell & Russell, LLP

(57) ABSTRACT

A rotary cutting tool having a disk-shaped cutting body with a plurality of identical insert receiving pockets, and an equal number of indexable cutting inserts removably retained therein, having opposing upper and lower surfaces and opposing first and second insert end surfaces. First and second cutting edges are formed at the intersection of the upper surface and the first and second insert end surfaces, respectively. Circumferentially adjacent cutting inserts have a different one of their first and second insert end surfaces in contact with an insert receiving pocket back wall. First and second planes are equidistantly offset from opposite sides of the cutting body, the first plane only intersecting the first cutting edge of every circumferentially alternate cutting insert and none of the second cutting edges, and the second plane only intersecting the second cutting edge of every circumferentially alternate cutting insert and none of the first cutting edges.

21 Claims, 7 Drawing Sheets

(52) U.S. Cl.
CPC .............. *B23C 2200/0472* (2013.01); *B23C 2200/121* (2013.01); *B23C 2200/161* (2013.01); *B23C 2210/168* (2013.01); *B23C 2210/285* (2013.01)

(58) Field of Classification Search
CPC ... B23C 5/2239; B23C 5/2221; B23C 5/2204; B23C 2210/168; B23C 2200/0455; B23C 2200/0494; B23C 2200/361
See application file for complete search history.

(56) References Cited

U.S. PATENT DOCUMENTS

| | | | | |
|---|---|---|---|---|
| 9,630,264 | B2 * | 4/2017 | Matsubara | B23C 5/207 |
| 2002/0066352 | A1 * | 6/2002 | Satran | B23C 5/08 83/839 |
| 2006/0120812 | A1 * | 6/2006 | Hecht | B23B 27/04 407/48 |
| 2013/0051936 | A1 * | 2/2013 | Satran | B23C 5/08 407/42 |
| 2013/0071194 | A1 * | 3/2013 | Hecht | B23C 5/08 407/103 |
| 2014/0377020 | A1 * | 12/2014 | Kurokawa | B23C 5/08 407/51 |
| 2015/0251255 | A1 * | 9/2015 | Lee | B23C 5/08 407/48 |
| 2016/0023287 | A1 * | 1/2016 | Chang | B23C 5/2239 407/48 |
| 2017/0368617 | A1 * | 12/2017 | Choi | B23C 3/305 |

FOREIGN PATENT DOCUMENTS

| | | |
|---|---|---|
| JP | 2015/196203 A | 11/2015 |
| WO | 2010/083541 A1 | 7/2010 |

OTHER PUBLICATIONS

Written Opinion of the International Searching Authority dated Feb. 12, 2019 for International Patent Application No. PCT/IL2018/051116 (7 pages).

* cited by examiner

ROTARY CUTTING TOOL HAVING DISK-SHAPED CUTTING BODY AND INDEXABLE CUTTING INSERT THEREFOR

FIELD OF THE INVENTION

The present invention relates to a rotary cutting tool having a disk-shaped cutting body and an indexable cutting insert therefor, for use in metal cutting processes in general, and for slotting operations in particular.

BACKGROUND OF THE INVENTION

Within the field of rotary cutting tools used in slotting operations, there are many examples of disk-shaped cutting bodies having a plurality of insert receiving pockets and a plurality of cutting inserts removably retained therein.

WO 2010/083541 A1 discloses a slotting cutter having a disk-shaped cutting body with a plurality of identical insert receiving pockets and an equal number of identical non-indexable cutting inserts removably retained therein.

JP 2015-196203 A discloses a slotting cutter having a disk-shaped cutting body with a plurality of non-identical insert receiving pockets and an equal number of identical indexable cutting inserts removably retained therein.

There is a need in the field for an improved rotary cutting tool having a disk-shaped cutting body with a plurality of identical insert receiving pockets and an equal number of identical indexable cutting inserts removably retained therein.

There is a need in the field for an improved rotary cutting tool in which each indexable cutting insert is retained in its respective insert receiving pocket with a high level of stability.

There is a need in the field for an improved rotary cutting tool capable of performing cutting operations at high feed rates.

SUMMARY OF THE INVENTION

In accordance with the present invention, there is provided a cutting tool having features designed in an effort to satisfy one or more of the aforementioned needs in the field. The cutting tool, under one aspect of the invention, comprising:

a disk-shaped cutting body having an axis of rotation defining a direction of rotation about the axis of rotation, opposing first and second body end surfaces and a body peripheral surface extending therebetween, a plurality of identical insert receiving pockets circumferentially spaced about the body peripheral surface and an equal number of identical indexable cutting inserts removably retained therein, each insert receiving pocket opening out to the first and second body end surfaces, and having a seat surface and a back wall transverse to the seat surface, and each cutting insert having opposing upper and lower surfaces and an insert peripheral surface therebetween and an insert axis extending therethrough, the insert peripheral surface having opposing first and second insert end surfaces spaced apart by opposing first and second insert side surfaces, with first and second cutting edges formed at the intersection of the upper surface and the first and second insert end surfaces, respectively, wherein:

each cutting insert's lower surface is in contact with the seat surface of its respective insert receiving pocket, and circumferentially adjacent cutting inserts have a different one of their first and second insert end surfaces in contact with the back wall of their respective insert receiving pocket, wherein:

a median plane perpendicular to the axis of rotation intersects the body peripheral surface, and first and second planes are equidistantly offset from opposite first and second sides of the median plane, respectively, and wherein:

the first plane only intersects the first cutting edge of every circumferentially alternate cutting insert at a first intersection point and none of the second cutting edges, and the second plane only intersects the second cutting edge of every circumferentially alternate cutting insert at a second intersection point and none of the first cutting edges.

Also in accordance with the present invention, there is provided an indexable cutting insert comprising:

opposing upper and lower surfaces and an insert peripheral surface therebetween and an insert axis extending therethrough, the lower surface having a bearing surface and first and second lower abutment surfaces transverse thereto, and the insert peripheral surface having opposing first and second insert end surfaces spaced apart by opposing first and second insert side surfaces, with first and second cutting edges formed at the intersection of the upper surface and the first and second insert end surfaces, respectively, wherein in a cross-section taken in a horizontal plane perpendicular to the insert axis and intersecting the insert peripheral surface:

first and second peripheral corner points formed at the intersection of the first insert end surface and the first and second insert side surfaces, respectively, define the end points of a first lateral side of an imaginary acute trapezoid, third and fourth peripheral corner points formed at the intersection of the second insert end surface and the first and second insert side surfaces, respectively, define the end points of a second lateral side of the imaginary acute trapezoid, and the first and third peripheral corner points define the end points of a short base of the acute trapezoid, and the second and fourth peripheral corner points define the end points of a long base of the acute trapezoid, and wherein in a bottom view of the cutting insert:

the first and second lower abutment surfaces form an obtuse first tilt angle and are located inside the imaginary acute trapezoid.

BRIEF DESCRIPTION OF THE DRAWINGS

For a better understanding, the invention will now be described, by way of example only, with reference to the accompanying drawings in which chain-dash lines represent cut-off boundaries for partial views of a member and in which.

DETAILED DESCRIPTION OF THE INVENTION

Figure 1:
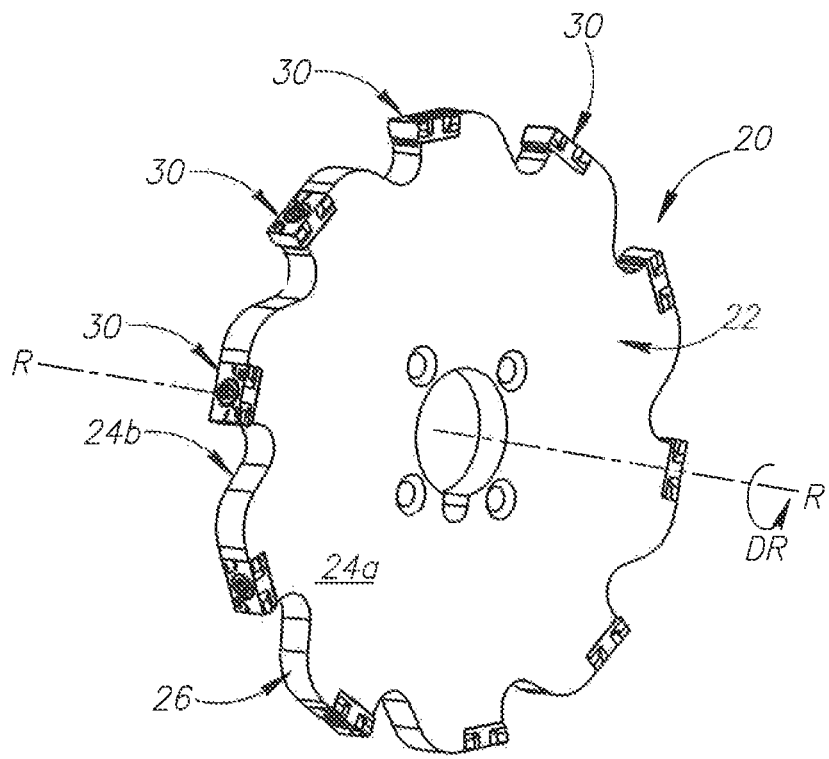
FIG. 1 is a perspective view of a cutting tool in accordance with some embodiments of the present invention.

As shown in FIGS. 1 to 6, the present invention relates to a cutting tool 20 comprising a disk-shaped cutting body 22 having an axis of rotation R defining a direction of rotation DR about the axis of rotation R, two opposing first and second body end surfaces 24a, 24b and a body peripheral surface 26 extending therebetween.

A median plane M perpendicular to the axis of rotation R intersects the body peripheral surface 26, and first and second planes P1, P2 are equidistantly offset from opposite first and second sides S1, S2 of the median plane M, respectively.

In some embodiments of the present invention, neither of the first and second planes P1, P2 may intersect the cutting body 22.

In other embodiments of the present invention (not shown), the first and second planes P1, P2 may be annular shaped, thus ensuring that neither of the first and second planes P1, P2 intersect a raised central portion of the cutting body 22.

According to a first aspect of the present invention, as shown in FIGS. 1 to 6, a plurality of identical insert receiving pockets 28 are circumferentially spaced about the body peripheral surface 26 and an equal number of identical indexable cutting inserts 30 are removably retained therein.

By virtue of the plurality of identical insert receiving pockets 28 being identical, it should be appreciated that the cutting body 22 can be simply and cost-effectively manufactured.

In some embodiments of the present invention, the body peripheral surface 26 may have a total of N insert receiving pockets 28 and exhibit N-fold rotational symmetry about the axis of rotation R.

Also in some embodiments of the present invention, the cutting tool 20 may exhibit N/2-fold rotational symmetry about the axis of rotation R.

It should be appreciated that for embodiments of the present invention in which the cutting tool 20 exhibits N/2-fold rotational symmetry about the axis of rotation R, N is an even number.

In some embodiments of the present invention, the cutting inserts 30 may be manufactured by a suitably hard material, preferably by form pressing and sintering a cemented carbide, such as tungsten carbide, and the cutting body 22 may be manufactured from a less hard material.

As shown in FIGS. 2 to 5, each insert receiving pocket 28 opens out to the first and second body end surfaces 24a, 24b, and has a seat surface 32 and a back wall 34 shown in this embodiment as being transverse to the seat surface 32.

Also, as shown in FIGS. 2 to 5, each insert receiving pocket 28 may open out to a chip gullet 35, and each chip gullet 35 may be located rotationally forward of its respective insert receiving pocket 28, thus aiding chip evacuation.

In some embodiments of the present invention, each insert receiving pocket's back wall 34 may be perpendicular to the median plane M.

Also in some embodiments of the present invention each insert receiving pocket's back wall 34 may face in the direction of rotation DR.

Figure 5:
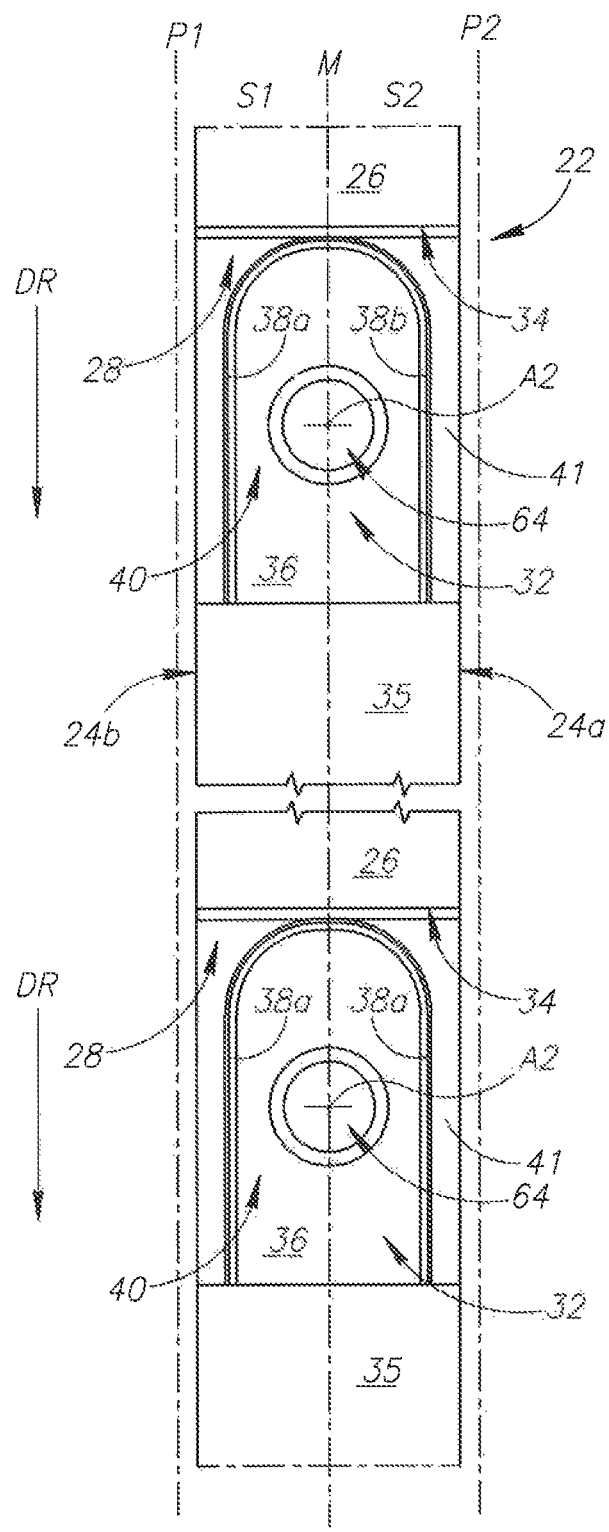
FIG. 5 is a detailed radial side view of the cutting tool shown in FIG. 1, 'flattened out' for illustrative purposes, with the associated cutting inserts and clamping screws removed.

As shown in FIG. 5, each insert receiving pocket's seat surface 32 may have a floor surface 36 and first and second lateral support surfaces 38a, 38b transverse thereto, and the first and second lateral support surfaces 38a, 38b may be located on the first and second sides S1, S2 of the median plane M, respectively.

In some embodiments of the present invention, the floor surface 36 and the first and second lateral support surfaces 38a, 38b of each seat surface 32 may be contiguous with their respective chip gullet 35.

Also in some embodiments of the present invention, the floor surface 36 and the first and second lateral support surfaces 38a, 38b may be formed in a central recess 40 of the seat surface 32, and the first and second lateral support surfaces 38a, 38b may face towards each other.

Further in some embodiments of the present invention, the first and second lateral support surfaces 38a, 38b may extend parallel to the median plane M. For such embodiments, the plurality of identical seat surfaces 32 can be simply and cost-effectively manufactured.

Yet further in some embodiments of the present invention, each seat surface 32 may include a planar raised shoulder surface 41 partially surrounding the central recess 40.

As shown in FIGS. 7 to 11, each cutting insert 30 has opposing upper and lower surfaces 42, 44 and an insert peripheral surface 46 therebetween and an insert axis A1 extending therethrough.

In some embodiments of the present invention, a through bore 48 coaxial with the insert axis A1 may intersect the upper and lower surfaces 42, 44.

Also in some embodiments of the present invention, each cutting insert 30 may not exhibit rotational symmetry about its insert axis A1.

Figure 8:
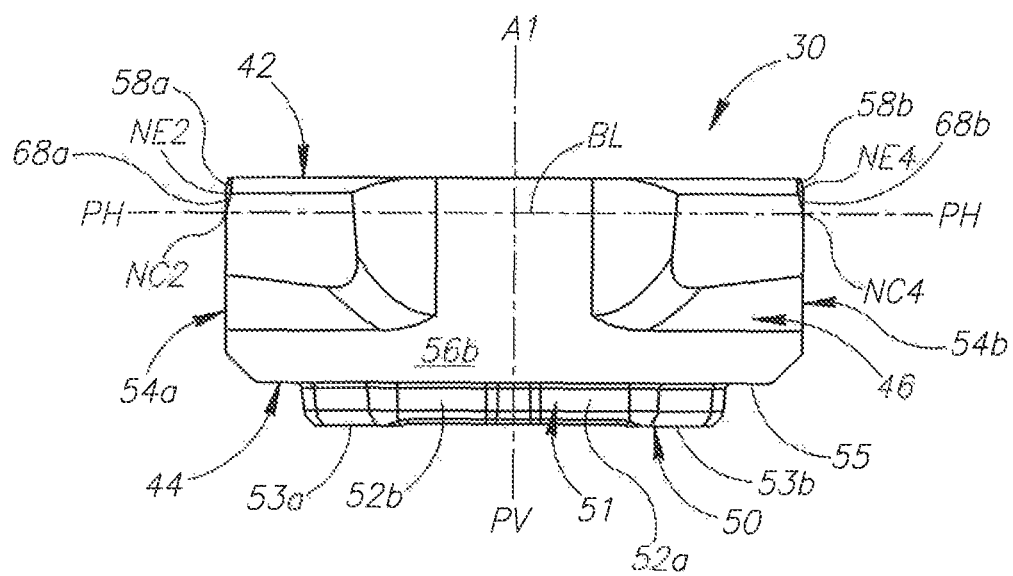
FIG. 8 is a side view of the cutting insert shown in FIG. 7.
Figure 9:
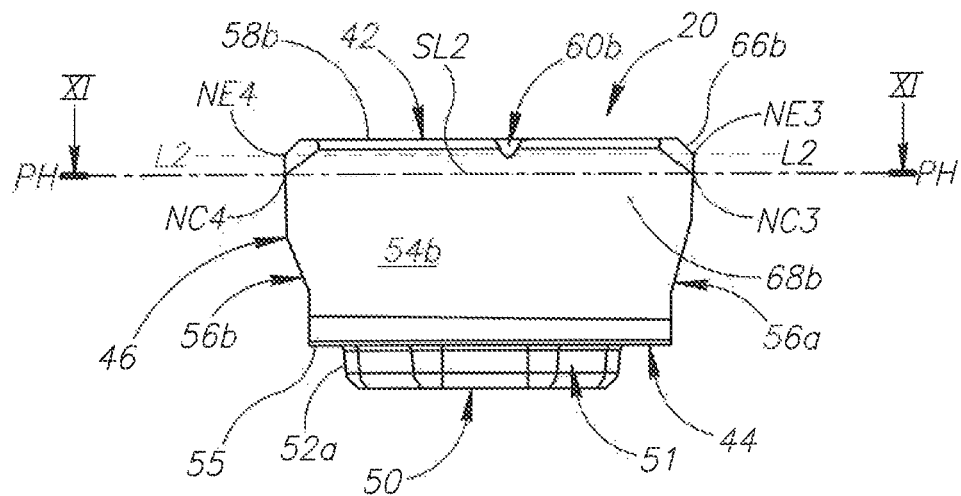
FIG. 9 is an end view of the cutting insert shown in FIG. 7.
Figure 10:
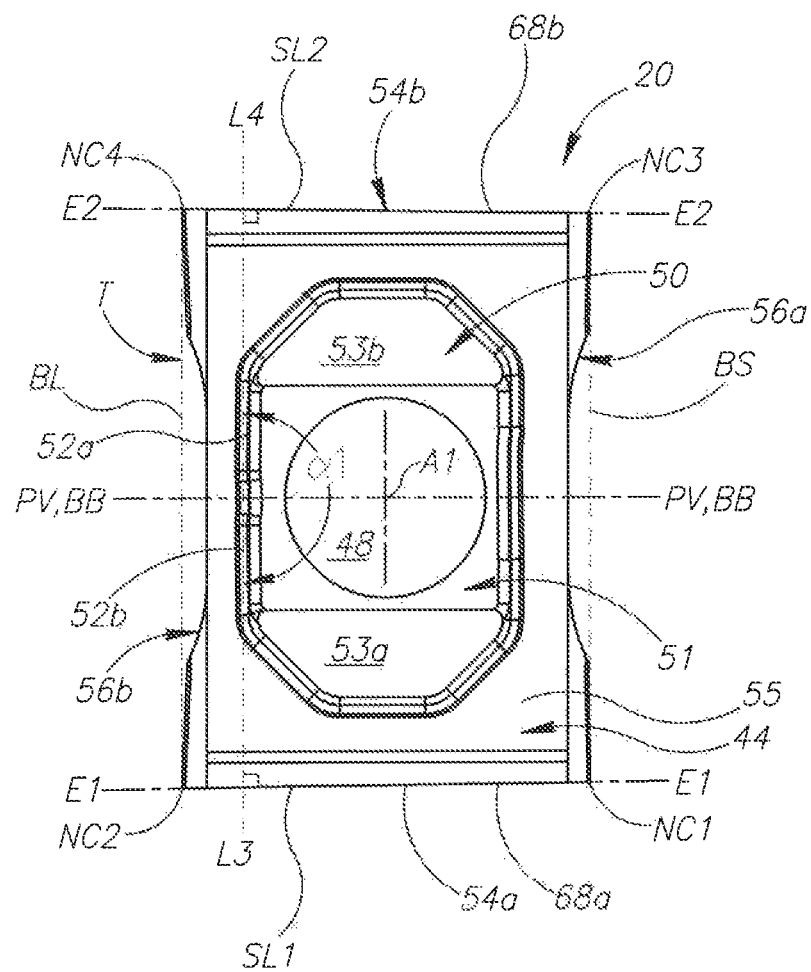
FIG. 10 is a bottom view of the cutting insert shown in FIG. 7.

As shown in FIGS. 8 to 10, the lower surface 44 has a bearing surface 50 and first and second lower abutment surfaces 52a, 52b transverse thereto.

In some embodiments of the present invention, the first and second lower abutment surfaces 52a, 52b may be spaced apart.

Also in some embodiments of the present invention, the first and second lower abutment surfaces 52a, 52b may be planar.

As shown in FIGS. 8 to 10, the bearing surface 50 and the first and second lower abutment surfaces 52a, 52b may be formed on a central boss 51 protruding from the lower surface 44.

In some embodiments of the present invention, the bearing surface 50 may comprise at least two coplanar bearing sub-surfaces 53a, 53b.

Also in some embodiments of the present invention, the lower surface 44 may include a planar bottom surface 55 surrounding the central boss 51.

As shown in FIG. 10, in a bottom view of one of the cutting inserts 30, the first and second lower abutment surfaces 52a, 52b form an obtuse first tilt angle $\alpha1$.

In some embodiments of the present invention, the first tilt angle α1 may be greater than 170 degrees and less than 180 degrees, and with 178 degrees shown in the illustrated example of FIG. 10.

Also in some embodiments of the present invention, the first tilt angle α1 may be an internal angle.

It should be appreciated that use of the term "internal angle" throughout the description and claims refers to an angle between two planar surface components or zones as measured internal to the member on which the surface components or zones are formed, respectively.

As shown in FIGS. 7 to 11, the insert peripheral surface 46 has opposing first and second insert end surfaces 54a, 54b spaced apart by opposing first and second insert side surfaces 56a, 56b, with first and second cutting edges 58a, 58b formed at the intersection of the upper surface 42 and the first and second insert end surfaces 54a, 54b, respectively.

In some embodiments of the present invention, the first cutting edge 58a may be interrupted by a first chip dividing notch 60a, and the second cutting edge 58b may be interrupted by a second chip dividing notch 60b.

Also in some embodiments of the present invention, the first and second insert end surfaces 54a, 54b may converge towards the first insert side surface 56a, and the first and second lower abutment surfaces 52a, 52b may face in the same direction as the second insert side surface 56b.

Further in some embodiments of the present invention, each cutting insert 30 may exhibit mirror symmetry about a vertical plane PV containing its insert axis A1 and intersecting its first and second insert side surfaces 56a, 56b.

Figure 3:
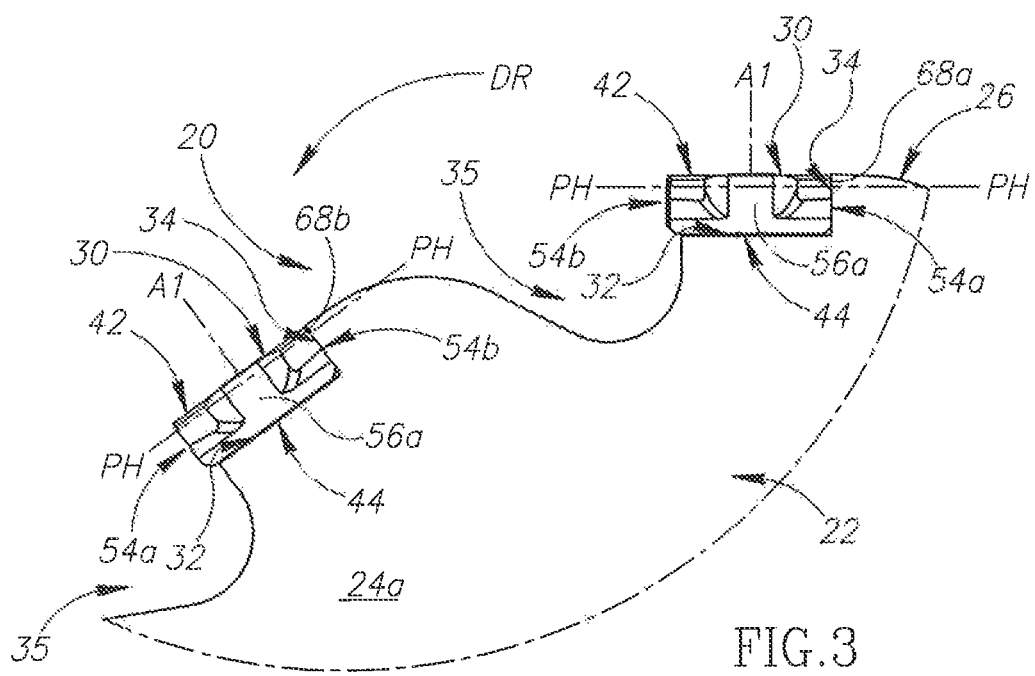
FIG. 3 is a detailed axial end view of the cutting tool shown in FIG. 1.
Figure 4:
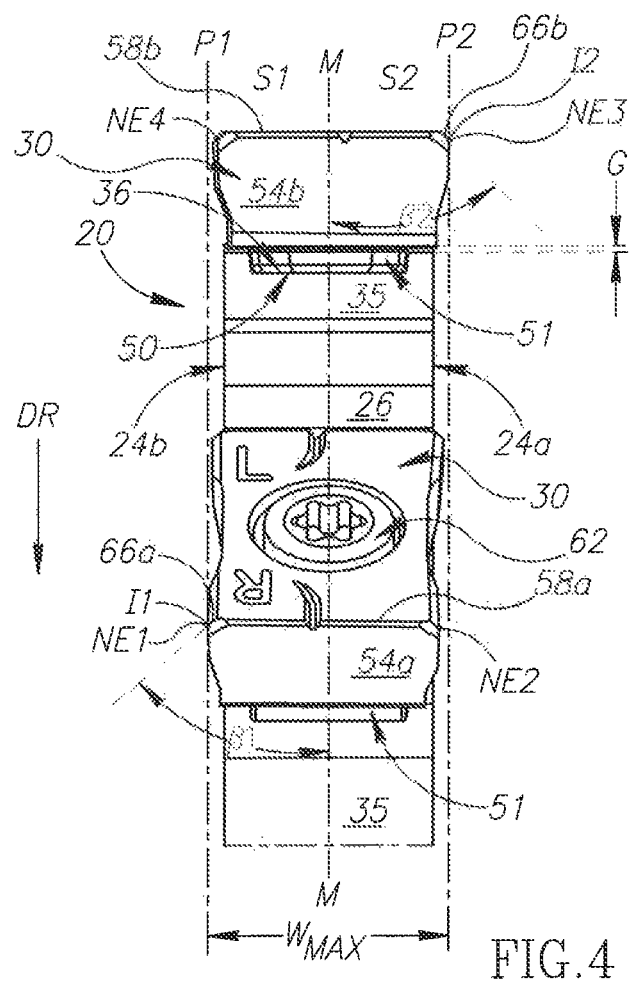
FIG. 4 is a detailed tangential side view of the cutting tool shown in FIG. 1.

According to the first aspect of the present invention, as shown in FIGS. 3 and 4, each cutting insert's lower surface 44 is in contact with the seat surface 32 of its respective insert receiving pocket 28, and circumferentially adjacent cutting inserts 30 have a different one of their first and second insert end surfaces 54a, 54b in contact with the back wall 34 of their respective insert receiving pocket 28.

In some embodiments of the present invention, a clamping screw 62 may extend through the through bore 48 and threadingly engage a screw bore 64 in the seat surface 32.

Figure 2:
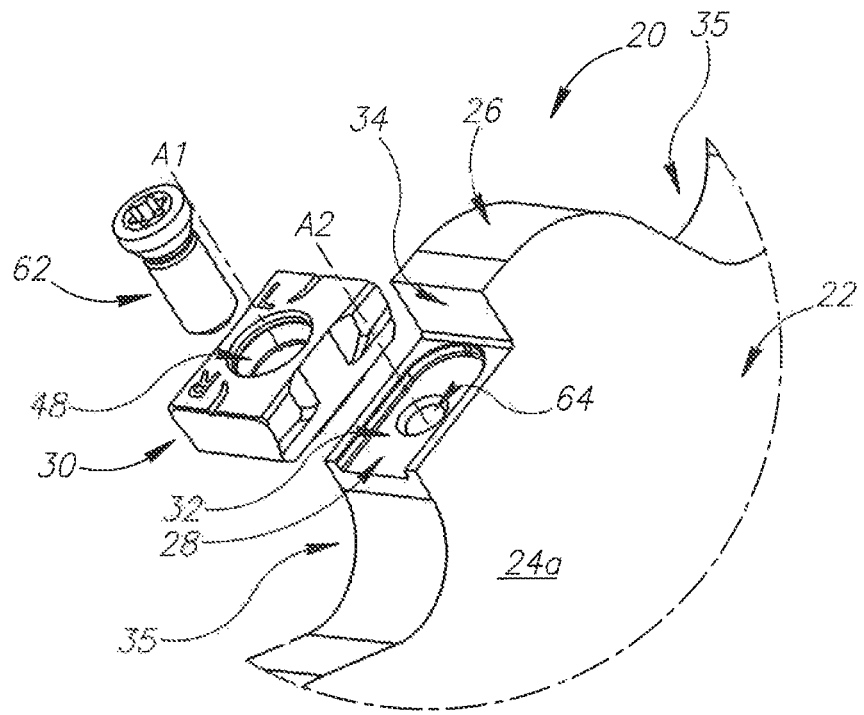
FIG. 2 is a detailed exploded perspective view of the cutting tool shown in FIG. 1.

Also in some embodiments of the present invention, as shown in FIGS. 2 and 5, the screw bore 64 may be formed in the floor surface 36.

Further in some embodiments of the present invention, the screw bore 64 may have a screw axis A2 contained in the median plane M.

Yet further in some embodiments of the present invention, the insert axis A1 of each cutting insert 30 may be non-coaxial with the screw axis A2 of its respective insert receiving pocket 28, and thus each through bore 48 may be eccentrically positioned in relation to its respective screw bore 64.

Yet still further in some embodiments of the present invention, each insert's bearing surface 50 may be in contact with the floor surface 36 of its respective insert receiving pocket 28.

As shown in FIG. 4, the bottom surface 55 may be spaced apart from the raised shoulder surface 41 by a gap G.

Figure 6:
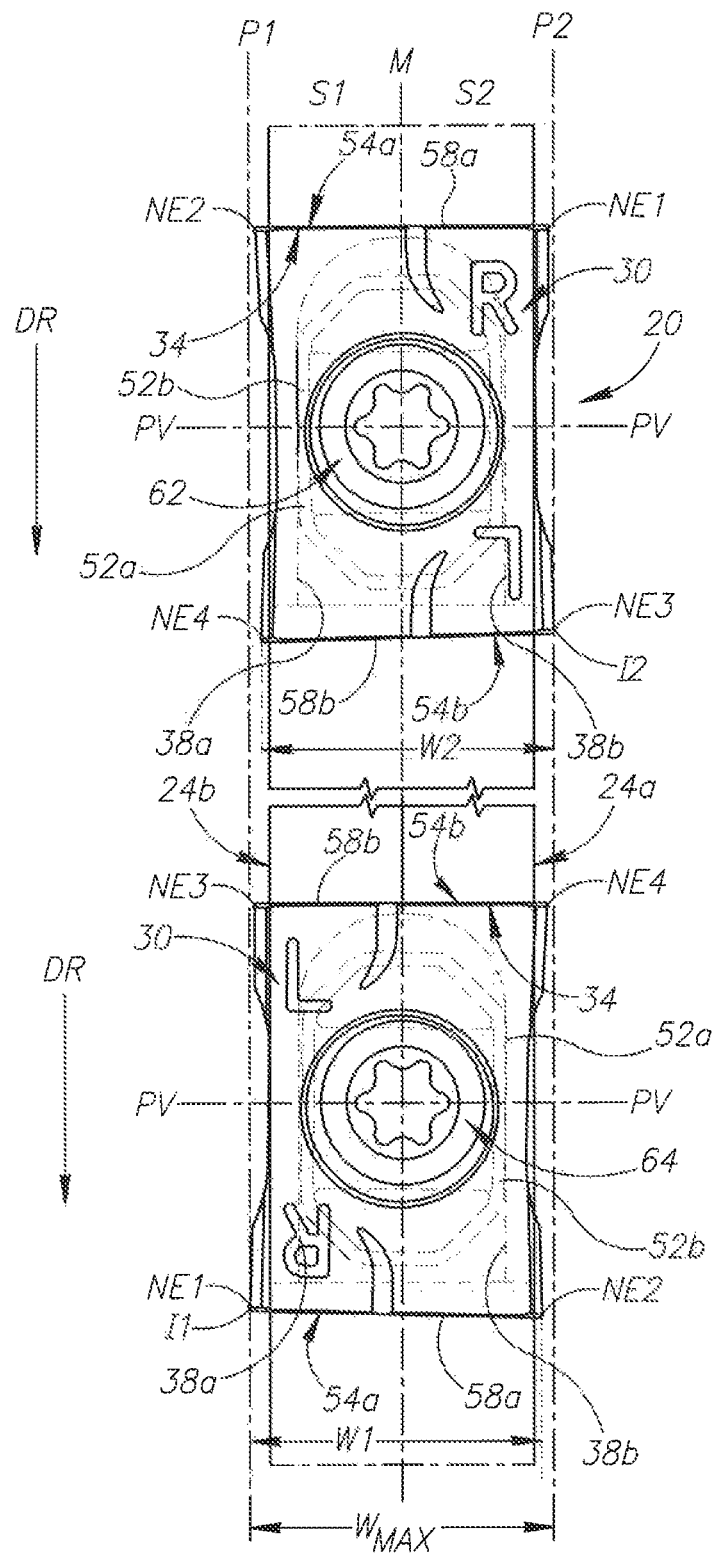
FIG. 6 is a detailed radial side view of the cutting tool shown in FIG. 1, 'flattened out' for illustrative purposes, with the associated cutting inserts retained therein.

As shown in FIG. 6, the median plane M may intersect the first and second cutting edges 58a, 58b of each cutting insert 30.

In some embodiments of the present invention, as shown in FIG. 6, each cutting insert's vertical plane PV may be non-perpendicular to the median plane M, albeit with a deviation of 1 degree therefrom.

According to the first aspect of the present invention, as shown in FIG. 6, the first plane P1 only intersects the first cutting edge 58a of every circumferentially alternate cutting insert 30 at a first intersection point I1 and none of the second cutting edges 58b, and the second plane P2 only intersects the second cutting edge 58b of every circumferentially alternate cutting insert 30 at a second intersection point I2 and none of the first cutting edges 58a.

As shown in FIG. 6, the first and second cutting edges 58a, 58b intersecting the first and second planes P1, P2, respectively, may be operative and associated with first and second insert end surfaces 54a, 54b, respectively, not in contact with the back wall 34.

It should be appreciated that once the operative first and second cutting edges 58a, 58b become worn, each cutting insert 30 may be indexed in its respective insert receiving pocket 28, such that the unworn first and second cutting edges 58a, 58b become operative.

Alternatively, it should be appreciated that once the operative first and second cutting edges 58a, 58b become worn, each cutting insert 30 may be relocated to another insert receiving pocket 28, such that the unworn first and second cutting edges 58a, 58b become operative, although the operator must ensure that the first plane P1 only intersects the first cutting edge 58a of every circumferentially alternate cutting insert 30 and none of the second cutting edges 58b, and the second plane P2 only intersects the second cutting edge 58b of every circumferentially alternate cutting insert 30 and none of the first cutting edges 58a.

In some embodiments of the invention, the first chip dividing notches 60a associated with the operative first cutting edges 58a may be located on one side of the median plane M, and the second chip dividing notches 60b associated with the operative second cutting edges 58b may be located on the opposite side of the median plane M.

It should be appreciated that the first and second chip dividing notches 60a, 60b provide the operator with a useful visual indictor, when indexing and replacing the cutting inserts 30.

It should also be appreciated that the inclusion of different recessed or embossed shapes or letters, for example, "R" and "L" adjacent the first and second cutting edges 58a, 58b, respectively, provides the operator with an alternative visual indicator.

As shown in FIG. 6, each first cutting edge 58a may have first and second end points NE1, NE2 located on opposite sides of the median plane M, and each second cutting edge 58b may have third and fourth end points NE3, NE4 located on opposite sides of the median plane M.

In some embodiments of the present invention, the first end point NE1 of each operative first cutting edge 58a may be contained in the first plane P1 and thus coincident with its associated first intersection point I1, and the third end point NE3 of each operative second cutting edge 58b may be contained in the second plane P2 and thus coincident with its associated second intersection point I2. For such embodiments of the present invention, the lateral distance between the first and second planes P1, P2 may define a maximum tool cutting width $W_{MAX}$ of the cutting tool 20.

As shown in FIG. 6, the second end point NE2 of each operative first cutting edge 58a may be located a first cutting width W1 from the first plane P1, and the fourth end point NE4 of each operative second cutting edge 58b may be located a second cutting width W2 from the second plane P2.

In some embodiments of the present invention, the first cutting width W1 may be at least nine tenths of the maximum tool cutting width $W_{MAX}$, i.e. $W1 \geq W_{MAX}*9/10$, and the second cutting distance W2 may be at least nine tenths of the maximum tool cutting width $W_{MAX}$ i.e. $W2 \geq W_{MAX}*9/10$.

Also in some embodiments of the present invention, the first cutting distance W1 may be equal to the second cutting distance W2.

As shown in FIG. 4, each operative first cutting edge 58a may have an inclined first end portion 66a extending from its first end point NE1 and forming an acute first end angle β1 of less than 60 degrees with median plane M, and each operative second cutting edge 58b may have an inclined second end portion 66b extending from its third end point NE3 and forming an acute second end angle β2 of less than 60 degrees with median plane M.

In some embodiments of the present invention, the first and second end angles β1, β2 may be equal.

It should be appreciated that for embodiments of the present invention having first and second end angles β1, β2 of less than 60 degrees, the cutting chip thickness will be suitably and advantageously reduced.

In some embodiments of the present invention, the inclined first end portion 66a of each operative first cutting edge 58a may laterally overlap the second cutting width W2, and the inclined second end portion 66b of each operative second cutting edge 58b may laterally overlap the first cutting width W1.

It should be appreciated that for embodiments of the present invention in which the inclined first and second end portions 66a, 66b laterally overlap the second and first cutting widths W2, W1, respectively, the operative first and second cutting edges 58a, 58b may be considered 'fully effective', enabling the cutting tool 20 to perform cutting operations at suitably and advantageously high feed rates.

In some embodiments of the present invention, the first lower abutment surface 52a of each cutting insert 30 having its first cutting edge 58a operative, may be in contact with one of the first and second lateral support surfaces 38a, 38b located on one of the first and second sides S1, S2 of the median plane M, and the second lower abutment surface 52b of each cutting insert 30 having its second cutting edge 58b operative, may be in contact with one of the first and second lateral support surfaces 38a, 38b located on the other one of the first and second sides S1, S2 of the median plane M.

Also in some embodiments of the present invention, the second lower abutment surface 52b of each cutting insert 30 having its first cutting edge 58a operative (e.g., see the lower part of FIG. 6), may not be in contact with any of the first and second lateral support surfaces 38a, 38b, and the first lower abutment surface 52a of each cutting insert 30 having its second cutting edge 58b operative (e.g., see the upper part of FIG. 6), may not be in contact with any of the first and second lateral support surfaces 38a, 38b.

It should be appreciated that apart from the bearing surface 50 being in contact with the floor surface 36 and one of the first and second lower abutment surfaces 52a, 52b being in contact with one of the first and second lateral support surfaces 38a, 38b, no other portion of each insert's lower surface 44 is in contact with the seat surface 32 of its respective insert receiving pocket 28.

It should also be appreciated that for embodiments of the present invention in which the back wall 34 of each insert receiving pocket 28 is perpendicular to the median plane M and the first and second lateral support surfaces 38a, 38b of each insert receiving pocket 28 extend parallel to the median plane M, by virtue of one of the first and second insert end surfaces 54a, 54b being in contact with the back wall 34, and one of the first and second lower abutment surfaces 52a, 52b being in contact with one of the first and second lateral support surfaces 38a, 38b, each cutting insert 30 is retained its respective insert receiving pocket 28 with a high level of stability.

In some embodiments of the present invention, the first lower abutment surface 52a of each cutting insert 30 having its first cutting edge 58a operative, may be in contact with the second lateral support surface 38b, and the second lower abutment surface 52b of each cutting insert 30 having its second cutting edge 58b operative, may be in contact with the first lateral support surface 38a.

Also in some embodiments of the present invention, the first lower abutment surface 52a of each cutting insert 30 having its first cutting edge 58a operative, may be entirely located further from the first intersection point I1 than the second lower abutment surface 52b, and the second lower abutment surface 52b of each cutting insert 30 having its second cutting edge 58b operative, may be entirely located further from the second intersection point I2 than the first lower abutment surface 52a.

It should be appreciated that for embodiments of the present invention in which the operative first or second lower abutment surface 52a, 52b of each cutting insert 30 is on the opposite side of the median plane M from its associated first or second intersection point I1, I2, and further away from its associated first or second intersection point I1, I2 than its adjacent non-operative second or first lower abutment surface 52b, 52a, the second or first lateral support surface 38b, 38a against which the operative first or second lower abutment surface 52a, 52b contacts, advantageously counteracts the moment on the cutting insert 30 caused by unbalanced cutting forces, which include cutting force components directed through the first and second intersection points I1, I2.

Figure 11:
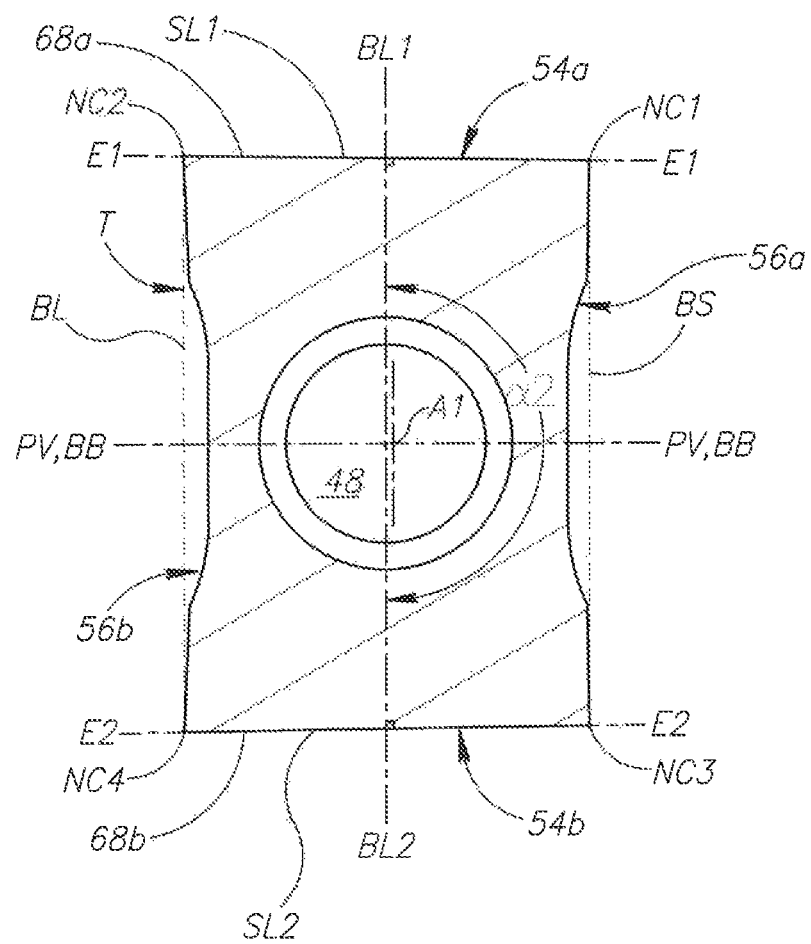
FIG. 11 is a cross-sectional view of the cutting insert shown in FIG. 9, taken along the line XI-XI.

According to an additional aspect of the present invention, as shown in FIG. 11, in a cross-section taken in a horizontal plane PH perpendicular to the insert axis A1 and intersecting the insert peripheral surface 46 of one of the cutting inserts 30:

first and second peripheral corner points NC1, NC2 formed at the intersection of the first insert end surface 54a and the first and second insert side surfaces 56a, 56b, respectively, define the end points of a first lateral side SL1 of an imaginary acute trapezoid T, and third and fourth peripheral corner points NC3, NC4 formed at the intersection of the second insert end surface 54b and the first and second insert side surfaces 56a, 56b, respectively, define the end points of a second lateral side SL2 of the imaginary acute trapezoid T.

In some embodiments of the present invention, the first and second lateral sides SL1, SL2 may be equal in length, and the imaginary acute trapezoid T may be an isosceles trapezoid.

Also in some embodiments of the present invention, the horizontal plane PH may be located closer to the upper surface 42 than to the lower surface 44, and as shown in FIG. 11, no portion of the cutting insert 30 below the horizontal plane PH may extend outside the imaginary acute trapezoid T.

Further in some embodiments of the present invention, the first and second lateral sides SL1, SL2 may be bisected by first and second lateral bisectors BL1, BL2, and the first and second lateral bisectors BL1, BL2 may form an obtuse second tilt angle α2.

Yet further in some embodiments of the present invention, the second tilt angle α2 may be equal to the first tilt angle α1.

Figure 7:
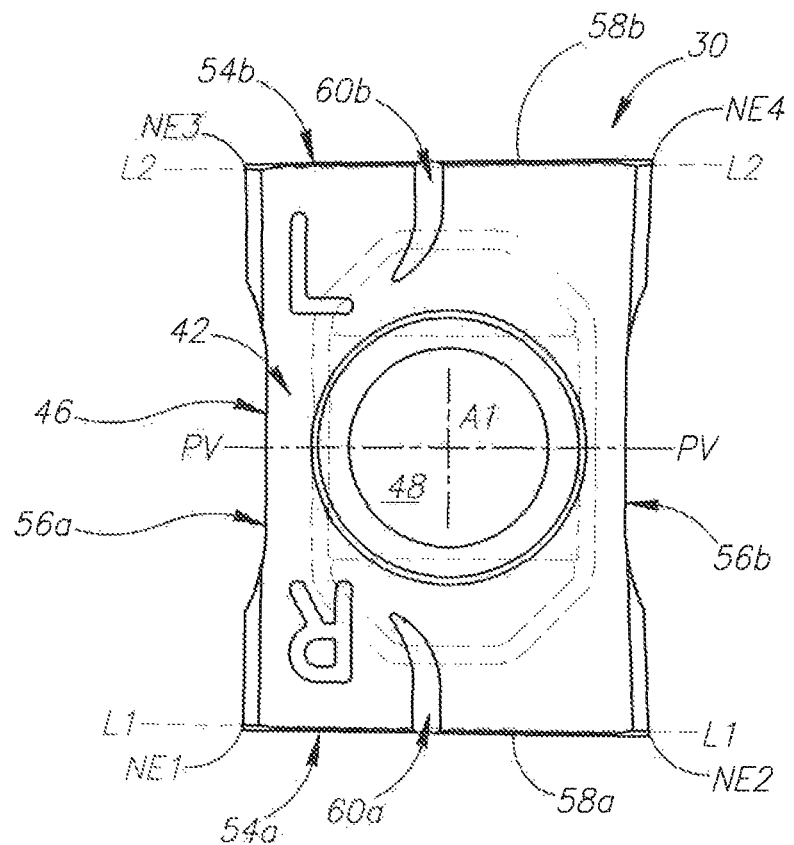
FIG. 7 is a top view of a cutting insert according to the present invention.

As shown in FIG. 7, the first and second end points NE1, NE2 of the first cutting edge 58a define an imaginary first straight line L1, and the third and fourth end points NE3, NE4 of the second cutting edge 58b define an imaginary second line L2.

In some embodiments of the present invention, the imaginary first straight line L1 may be parallel to one of the first and second lateral sides SL1, SL2, and the imaginary second straight line L2 may be parallel to one of the first and second lateral sides SL1, SL2.

As shown in FIGS. 7 to 11, the imaginary first straight line L1 is parallel to the first lateral side SL1, and the imaginary second straight line L2 is parallel to the second lateral side SL2.

According to the "additional" aspect of the present invention described above with respect to FIG. 11, and with further reference to FIG. 10, in the bottom view of one of the cutting inserts 30, the first and second lower abutment surfaces 52a, 52b are located inside the imaginary acute trapezoid T.

In some embodiments of the present invention, the first and second lower abutment surfaces 52a, 52b may be entirely located inside the imaginary acute trapezoid T and not intersect the insert peripheral surface 46.

Also in some embodiments of the present invention, as shown in FIG. 10, imaginary third and fourth straight lines L3, IA extending parallel to the first and second lower abutment surfaces 52a, 52b, respectively, may be perpendicular to the first and second lateral sides SL1, SL2, respectively.

As shown in FIGS. 7 to 11, the first and second insert end surfaces 54a, 54b may include first and second end abutment surfaces 68a, 68b.

In some embodiments of the present invention, as shown in FIG. 8, the horizontal plane PH may intersect the first and second end abutment surfaces 68a, 68b.

As shown in FIG. 3, circumferentially adjacent cutting inserts 30 may have a different one of their first and second end abutment surfaces 68a, 68b in contact with the back wall 34 of their respective insert receiving pocket 28, and also such that each insert's horizontal plane PH intersects the back wall 34 of its respective insert receiving pocket 28.

In some embodiments of the present invention, the first and second end abutment surfaces 68a, 68b may be planar.

Also in some embodiments of the present invention, as shown in FIGS. 10 and 11, a first end plane E1 defined by the first end abutment surface 68a may contain the first lateral side SL1, and a second end plane E2 defined by the second end abutment surface 68b may contain the second lateral side SL2.

Further in some embodiments of the present invention, the second end abutment surface 68b may be located on one side of the first end plane E1 and no portion of the cutting insert 30 may extend to the other side thereof, and the first end abutment surface 68a may be located on one side of the second end plane E2 and no portion of the cutting insert 30 may extend to the other side thereof.

As shown in FIG. 11, the first and third peripheral corner points NC1, NC3 define the end points of a short base BS of the acute trapezoid T, and the second and fourth peripheral corner points NC2, NC4 define the end points of a long base BL of the acute trapezoid T.

As shown in FIG. 10, the first and second lower abutment surfaces 52a, 52b may face towards the long base BL.

In some embodiments of the present invention, the first and second lower abutment surfaces 52a, 52b may be entirely located on opposite sides of a base bisector BB bisecting at least one of the short and long bases BS, BL.

Also in some embodiments of the present invention, the vertical plane PV may contain the base bisector BB.

In other embodiments of the present invention (not shown), the imaginary first straight line L1 may be parallel to the second lateral side SL2, and the imaginary second straight line L2 may be parallel to the first lateral side SL1, and thus the imaginary first and second straight lines L1, L2 associated with the operative first and second cutting edges 58a, 58b, respectively, may be perpendicular to the median plane M.

Although the present invention has been described to a certain degree of particularity, it should be understood that various alterations and modifications could be made without departing from the spirit or scope of the invention as hereinafter claimed.

What is claimed is:

1. A cutting tool (20) comprising:
a disk-shaped cutting body (22) having an axis of rotation (R) defining a direction of rotation (DR) about the axis of rotation (R), opposing first and second body end surfaces (24a, 24b) and a body peripheral surface (26) extending therebetween,
a plurality of identical insert receiving pockets (28) circumferentially spaced about the body peripheral surface (26) and an equal number of identical indexable cutting inserts (30) removably retained therein,
each insert receiving pocket (28) opening out to the first and second body end surfaces (24a, 24b), and having a seat surface (32) and a back wall (34) transverse to the seat surface (32), and
each cutting insert (30) having opposing upper and lower surfaces (42, 44) and an insert peripheral surface (46) therebetween and an insert axis (A1) extending therethrough, the insert peripheral surface (46) having opposing first and second insert end surfaces (54a, 54b) spaced apart by opposing first and second insert side surfaces (56a, 56b), with first and second cutting edges (58a, 58b) formed at the intersection of the upper surface (42) and the first and second insert end surfaces (54a, 54b), respectively,
wherein:
each cutting insert's lower surface (44) is in contact with the seat surface (32) of its respective insert receiving pocket (28), and
circumferentially adjacent cutting inserts (30) have a different one of their first and second insert end surfaces (54a, 54b) in contact with the back wall (34) of their respective insert receiving pocket (28),
wherein:
a median plane (M) perpendicular to the axis of rotation (R) intersects the body peripheral surface (26), and
first and second planes (P1, P2) are equidistantly offset from opposite first and second sides (S1, S2) of the median plane (M), respectively,
and wherein:
the first plane (P1) only intersects the first cutting edge (58a) of every circumferentially alternate cutting insert (30) at a first intersection point (I1) and none of the second cutting edges (58b), and
the second plane (P2) only intersects the second cutting edge (58b) of every circumferentially alternate cutting insert (30) at a second intersection point (I2) and none of the first cutting edges (58a).

2. The cutting tool (20) according to claim 1, wherein the body peripheral surface (26) has a total of N insert receiving pockets (28) and exhibits N-fold rotational symmetry about the axis of rotation (R).

3. The cutting tool (20) according to claim 1, wherein:
the first and second cutting edges (58a, 58b) intersecting the first and second planes (P1, P2), respectively, are operative and associated with first and second insert end surfaces (54a, 54b), respectively, not in contact with the back wall (34).

4. The cutting tool (20) according to claim 3, wherein:
each insert receiving pocket's seat surface (32) has a floor surface (36) and first and second lateral support surfaces (38a, 38b) transverse thereto, the first and second lateral support surfaces (38a, 38b) located on the first and second sides (S1, S2) of the median plane (M), respectively, and
each cutting insert's lower surface (44) has a bearing surface (50) and first and second lower abutment surfaces (52a, 52b) transverse thereto,
and wherein:
the first lower abutment surface (52a) of each cutting insert (30) having its first cutting edge (58a) operative, is in contact with one of the first and second lateral support surfaces (38a, 38b) located on one of the first and second sides (S1, S2) of the median plane (M), and
the second lower abutment surface (52b) of each cutting insert (30) having its second cutting edge (58b) operative, is in contact with one of the first and second lateral support surfaces (38a, 38b) located on the other one of the first and second sides (S1, S2) of the median plane (M).

5. The cutting tool (20) according to claim 4, wherein:
the second lower abutment surface (52b) of each cutting insert (30) having its first cutting edge (58a) operative, is not in contact with any of the first and second lateral support surfaces (38a, 38b), and
the first lower abutment surface (52a) of each cutting insert (30) having its second cutting edge (58b) operative, is not in contact with any of the first and second lateral support surfaces (38a, 38b).

6. The cutting tool (20) according to claim 4, wherein in a bottom view of one of the cutting inserts (30):
the first and second lower abutment surfaces (52a, 52b) form an obtuse first tilt angle ($\alpha 1$).

7. The cutting tool (20) according to claim 4, wherein:
the floor surface (36) and the first and second lateral support surfaces (38a, 38b) are formed in a central recess (40) of the seat surface (32), and the first and second lateral support surfaces (38a, 38b) face towards each other, and
the bearing surface (50) and the first and second lower abutment surfaces (52a, 52b) are formed on a central boss (51) protruding from the lower surface (44).

8. The cutting tool (20) according to claim 4, wherein:
the first lower abutment surface (52a) of each cutting insert (30) having its first cutting edge (58a) operative, is in contact with the second lateral support surface (38b), and
the second lower abutment surface (52b) of each cutting insert (30) having its second cutting edge (58b) operative, is in contact with the first lateral support surface (38a).

9. The cutting tool (20) according to claim 3, wherein:
each first cutting edge (58a) has first and second end points (NE1, NE2) located on opposite sides of the median plane (M), and
each second cutting edge (58b) has third and fourth end points (NE3, NE4) located on opposite sides of the median plane (M).

10. The cutting tool (20) according to claim 9, wherein:
the first end point (NE1) of each operative first cutting edge (58a) is contained in the first plane (P1),
the third end point (NE3) of each operative second cutting edge (58b) is contained in the second plane (P1), and
the lateral distance between the first and second planes (P1, P2) defines a maximum tool cutting width ($W_{MAX}$).

11. The cutting tool (20) according to claim 10, wherein:
the second end point (NE2) of each operative first cutting edge (58a) is located a first cutting width (W1) from the first plane (P1), and
the fourth end point (NE4) of each operative second cutting edge (58b) is located a second cutting width (W2) from the second plane (P2),
and wherein:
the first cutting width (W1) is at least nine tenths of the maximum tool cutting width ($W_{MAX}$), and
the second cutting width (W2) is at least nine tenths of the maximum tool cutting width ($W_{MAX}$).

12. The cutting tool (20) according to claim 1, wherein each cutting insert (30) does not exhibit rotational symmetry about its insert axis (A1).

13. The cutting tool (20) according to claim 1, wherein each insert receiving pocket's back wall (34) faces in the direction of rotation (DR).

14. An indexable cutting insert (30) comprising:
opposing upper and lower surfaces (42, 44) and an insert peripheral surface (46) therebetween and an insert axis (A1) extending therethrough,
the lower surface (44) having a bearing surface (50) and first and second lower abutment surfaces (52a, 52b) transverse thereto, and
the insert peripheral surface (46) having opposing first and second insert end surfaces (54a, 54b) spaced apart by opposing first and second insert side surfaces (56a, 56b), with first and second cutting edges (58a, 58b) formed at the intersection of the upper surface (42) and the first and second insert end surfaces (54a, 54b), respectively,
wherein in a cross-section taken in a horizontal plane (PH) perpendicular to the insert axis (A1) and intersecting the insert peripheral surface (46):
first and second peripheral corner points (NC1, NC2) formed at the intersection of the first insert end surface (54a) and the first and second insert side surfaces (56a, 56b), respectively, define the end points of a first lateral side (SL1) of an imaginary acute trapezoid (T),
third and fourth peripheral corner points (NC3, NC4) formed at the intersection of the second insert end surface (54b) and the first and second insert side surfaces (56a, 56b), respectively, define the end points of a second lateral side (SL2) of the imaginary acute trapezoid (T), and
the first and third peripheral corner points (NC1, NC3) define the end points of a short base (BS) of the acute trapezoid (T), and the second and fourth peripheral corner points (NC2, NC4) define the end points of a long base (BL) of the acute trapezoid (T),
and wherein in a bottom view of the cutting insert (30):
the first and second lower abutment surfaces (52a, 52b) form an obtuse first tilt angle ($\alpha 1$) and are located inside the imaginary acute trapezoid (T).

15. The cutting insert (30) according to claim 14, wherein:
the horizontal plane (PH) is located closer to the upper surface (42) than to the lower surface (44), and
no portion of the cutting insert (30) below the horizontal plane (PH) extends outside the imaginary acute trapezoid (T).

16. The cutting insert (30) according to claim 14, wherein in the bottom view:
the first and second lower abutment surfaces (52a, 52b) face towards the long base (BL).

17. The cutting insert (30) according to claim 14, wherein in the bottom view:
imaginary third and fourth straight lines (L3, L4) extending parallel to the first and second lower abutment surfaces (52a, 52b), respectively, are perpendicular to the first and second lateral sides (SL1, SL2), respectively.

18. The cutting insert (30) according to claim 14, wherein:
the first and second lateral sides (SL1, SL2) are bisected by first and second lateral bisectors (BL1, BL2),
the first and second lateral bisectors (BL1, BL2) form an obtuse second tilt angle ($\alpha 2$), and
the second tilt angle ($\alpha 2$) is equal to the first tilt angle ($\alpha 1$).

19. The cutting insert (30) according to claim 14, exhibiting mirror symmetry about a vertical plane (PV) containing the insert axis (A1) and intersecting the first and second insert side surfaces (56a, 56b).

20. The cutting insert (30) according to claim 14, wherein:
the bearing surface (50) and the first and second lower abutment surfaces (52a, 52b) are formed on a central boss (51) protruding from the lower surface (44).

21. The cutting insert (30) according to claim 14, wherein the first tilt angle ($\alpha 1$) is an internal angle.

* * * * *